United States Patent [19]

Tsuda

[11] Patent Number: 5,430,738
[45] Date of Patent: Jul. 4, 1995

[54] INFORMATION TRANSMISSION SYSTEM FOR TRANSMITTING A DIGITAL INFORMATION SIGNAL DIVIDED INTO PACKETS WITH AN INFORMATION SIGNAL ERROR DIAGNOSIS AND CORRECTION FUNCTION

[75] Inventor: Youichirou Tsuda, Tokyo, Japan

[73] Assignee: Pioneer Electronic Corporation, Tokyo, Japan

[21] Appl. No.: 809,169

[22] Filed: Dec. 18, 1991

[30] Foreign Application Priority Data

Jan. 31, 1991 [JP] Japan .................. 3-011083
Jan. 31, 1991 [JP] Japan .................. 3-011085
Jan. 31, 1991 [JP] Japan .................. 3-011086

[51] Int. Cl.[6] .................. G06F 11/10; G08C 25/02
[52] U.S. Cl. .................. 371/37.1; 371/32
[58] Field of Search .................. 371/37.1, 8.2, 11.2, 371/20.1, 47.1, 48, 32-34

[56] References Cited

U.S. PATENT DOCUMENTS

4,507,782  3/1985  Kunimasa et al. .................. 371/37.1
5,159,452 10/1992  Kinoshita et al. .................. 371/37.1

FOREIGN PATENT DOCUMENTS

0337702 10/1989 European Pat. Off. .......... 371/37.1

Primary Examiner—Hoa T. Nguyen
Attorney, Agent, or Firm—Sughrue, Mion, Zinn, Macpeak & Seas

[57] ABSTRACT

An information transmission system includes a base station in which a digital information signal is divided into packets of a predetermined amount of information of a same type, a packet identification signal is inserted into each of the packets, the packet identification signal indicating the total number of consecutive packets carrying packet information of the same type and a packet number specifying an associated packet among the consecutive packets, and the packets are transmitted. The system includes a relay station, in which diagnosis data of an erred information signal is stored in a memory, and the diagnosis data is transmitted to the base station in response to a diagnosis return instruction sent from the base station. According to a further aspect of the invention, an error correction code is added to each packet and an error correction code for an identification code including a relay station pointing code is also added in the base station. In relay stations, error correction of the identification code is performed before the error correction of the packets.

13 Claims, 14 Drawing Sheets

BASE BAND SIGNAL OF DIGITAL SUBCARRIER AUDIO ADDITION SYSTEM

TRANSMISSION / RECEPTION TIMING

DATA FORMAT

HEADER FORMAT

11
PACKET FORMAT PROCESSING CIRCUIT

RELAY STATION

FORMAT OF RECORD SIGNAL

VIDEO PICK TIMING

FORMAT OF PICKUP Q

INFORMATION TRANSMISSION SYSTEM FOR TRANSMITTING A DIGITAL INFORMATION SIGNAL DIVIDED INTO PACKETS WITH AN INFORMATION SIGNAL ERROR DIAGNOSIS AND CORRECTION FUNCTION

BACKGROUND OF THE INVENTION

1. Field of the Invention

The present invention relates to an information transmission system for transmitting a digital information signal from a sender to a receiver, and more particularly, to an information transmission system and an information signal transmission apparatus both having functions to diagnose an information signal for an error and correct the error if any.

2. Description of Background Information

There is a well-known information transmission system which multiplexes digital information signals of different types along the time axis, and transmits the multiplexed signal to a receiver from a sender. In particular, it is a recent trend to permit multiple users to share a single line, like resales of communication lines. What is important in such multiplexed transmission is to prevent information signals of different types from being mixed with one another. As a solution to such mixing, information signals of the same type may be consecutively transmitted from the sender to the receiver. With an increase in the amount of information of the same type, however, the information transmission would occupy the line for a long time, disabling the use of the line for transmission of an information signal with a small amount of other information or an emergency information signal while the line is busy. This impairs the efficient use of the communication line.

Recently an information transmission system, such as a CATV system, which transmits an information signal from a base station to a relay station and retransmits the information signal from that relay station to terminals has become popular. Also known is a method of transmitting an information signal affixed with a redundancy code for error correction. It is however difficult for the error correct system to correct communication errors completely. If many errors occur during transmission, it is necessary to take some measures against the errors. There are many one way addressable (OWA) systems particularly among information transmission systems utilizing a communications satellite for signal transmission from the base station to a relay station due to various restrictions involving the equipment cost, the number of channels of satellite communication lines, etc. This is a disadvantage in that the base station cannot acquire the necessary diagnosis data when needed.

Further, there is proposed an information transmission apparatus which comprises a base station for separating a digital information signal into packets each carrying a predetermined amount of information, and transmitting the packets of information with an error correct code bit affixed to each divided information signal, and multiple relay stations for receiving the information signals. Each packet has the error correct code bit for correcting errors affixed to the end and an identification (ID) code including relay station pointing codes for the individual relay stations affixed to the head portion or header.

Each receiving station decodes the relay station pointing code in the ID code in each packet to determine whether or not that packet is addressed to itself. Since the error correct code bit is affixed to the end of each packet, however, any error correction for that packet is made after the whole packet of information is received. The receiving station should therefore pick up all the packets from the base station irrespective of the relay station pointing code in the ID code, thus impairing the efficiency of reception in each receiving station.

SUMMARY OF THE INVENTION

It is therefore a primary object of the present invention to provide an information transmission system which prevents information signals of the same type from occupying a line for a long period of time and prevents information signals of different types from being mixed, even when digital information signals of different types are transmitted after being multiplexed along the time axis.

It is another object of this invention to provide an information transmission system capable of acquiring diagnosis data of a transmitted information signal whenever necessary in a base station.

It is a further object of this invention to provide an information transmission system with high efficiency, which comprises a base station for separating a digital information signal into packets each carrying a predetermined amount of information, and for transmitting the packets of information with an error correct code bit affixed to each divided information signal, and multiple relay stations for receiving the information signals, and which permits each of the multiple relay stations to pick up only that packet addressed to itself, According to one aspect of the present invention, an information transmission system comprises a transmission station for transmitting a digital information signal and at least one receiving station for receiving the digital information signal, the transmission station is designed to have dividing means for dividing the digital information signal into packets of a predetermined amount of information of the same type, inserting means for inserting in each packet a packet identification signal, indicative of the total number of consecutive packets carrying packet information of the same type and a packet number specifying an associated packet among the consecutive packets, and transmission means for transmitting the packets containing the packet identification signal; and the receiving station includes a memory, extraction means for extracting the packet identification signal from the received digital information signal, and writing means for writing the digital information signal into the memory in an order of the packets numbers for each packet information of the same type in the packet identification signal extracted by the extraction means.

According to the second aspect of this invention, an information transmission system comprises a base station for transmitting an information signal and a relay station for receiving the information signal, the relay station includes detector means for detecting an error in the information signal and producing diagnosis data, a memory for storing the diagnosis data, and transmission means for transmitting the diagnosis data to the base station in response to a diagnosis return instruction sent from the base station.

According to the third aspect of this invention, an information transmission system has a base station for transmitting a digital information signal and a plurality of relay stations for receiving the information signal, the base station including dividing means for separating the digital information signal into packets of a predetermined amount of information, and inserting means for inserting first correction code bits for error correction and an identification code including relay station pointing codes of the individual relay stations in each of the packets, with second correction code bits for self error correction being included in the identification code; and the relay stations each comprising extraction means for extracting the identification code from the received packets and error correction means for performing error correction on the identification code acquired from the extraction means based on the second correction code bits.

In the information transmission system according to the first aspect of this invention, at the time a digital information signal is sent from the transmission station to the receiving station, the digital information signal is divided into packets of a predetermined amount of information of the same type, and a packet identification signal, comprised of the total number of consecutive packets carrying packet information of the same type and a packet number specifying an associated packet among the consecutive packets, is inserted into each packet. The resultant signal is then transmitted.

In the information transmission system according to the second aspect of this invention, the base station sends an information signal to the relay station, the relay station stores diagnosis data of an error in the information signal in the memory, and automatically transmitting the stored diagnosis data to the base station in response to a diagnosis return instruction sent from the base station.

In the information transmission apparatus according to the third aspect of this invention, the base station divides a digital information signal into packets of a predetermined amount of information, and transmits the packets each affixed with an error correct code bit to the multiple relay stations together with the identification code including a relay station pointing code for the self relay station and also affixed with an error correct code bit.

DETAILED DESCRIPTION OF THE PREFERRED EMBODIMENTS

Figure 1:
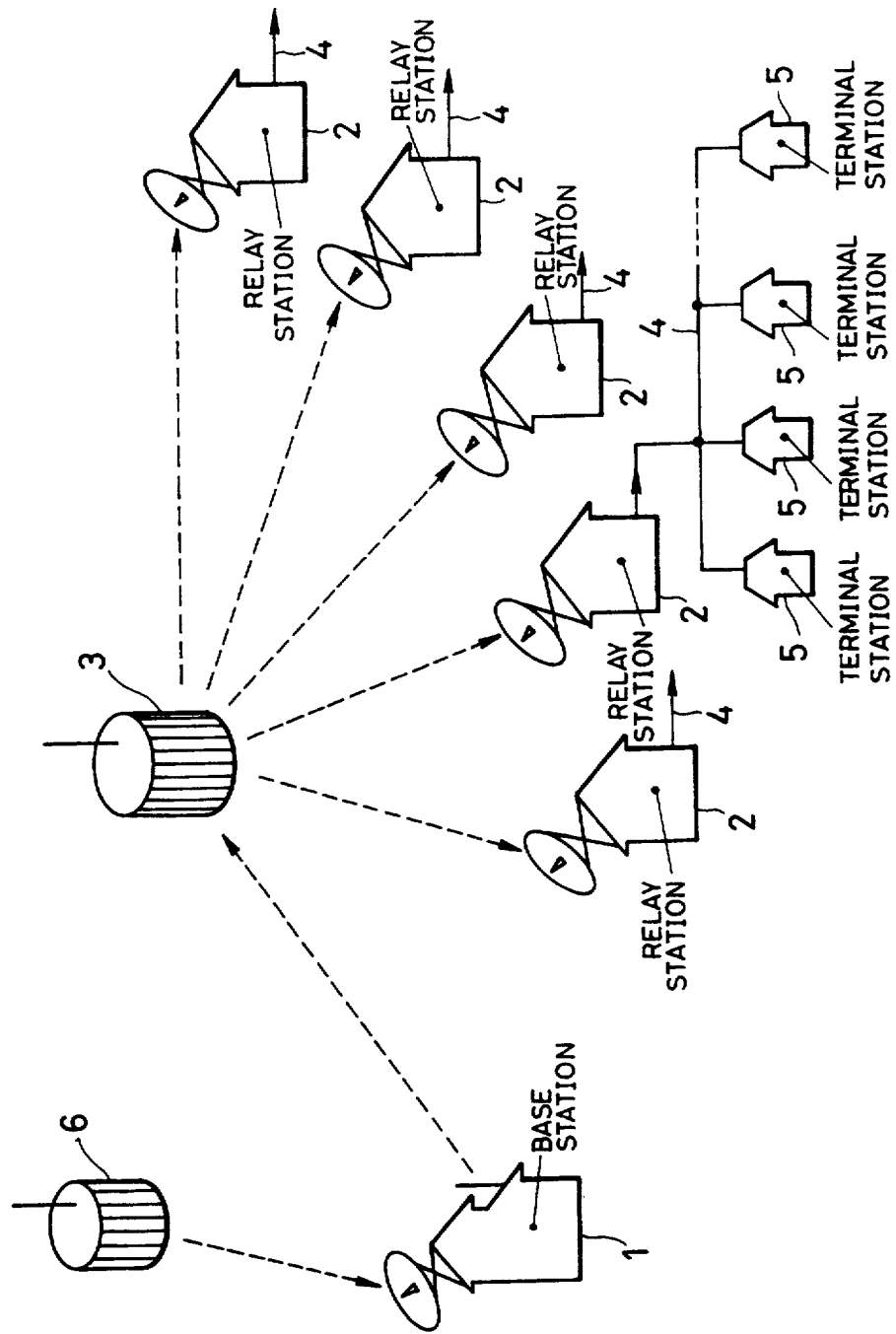
FIG. 1 is a diagram illustrating a CATV system utilizing a communications satellite according to the present invention.

Preferred embodiments of the present invention will now be described below referring to FIGS. 1 through 16. In FIG. 1, a base station 1 as a transmission station sends an information signal including video and audio information to each of multiple relay stations 2 as receiving stations by means of a communications satellite 3. Each relay station 2 edits the information signal, and retransmits it via a cable 4 to CATV terminals 5. The base station 1 further receives weather information from a meteorological satellite 6, such as "AMeDAS" of "Himawari," and prepares weather data as display information to be retransmitted to the terminal 5 from each relay station 2.

Figure 2:
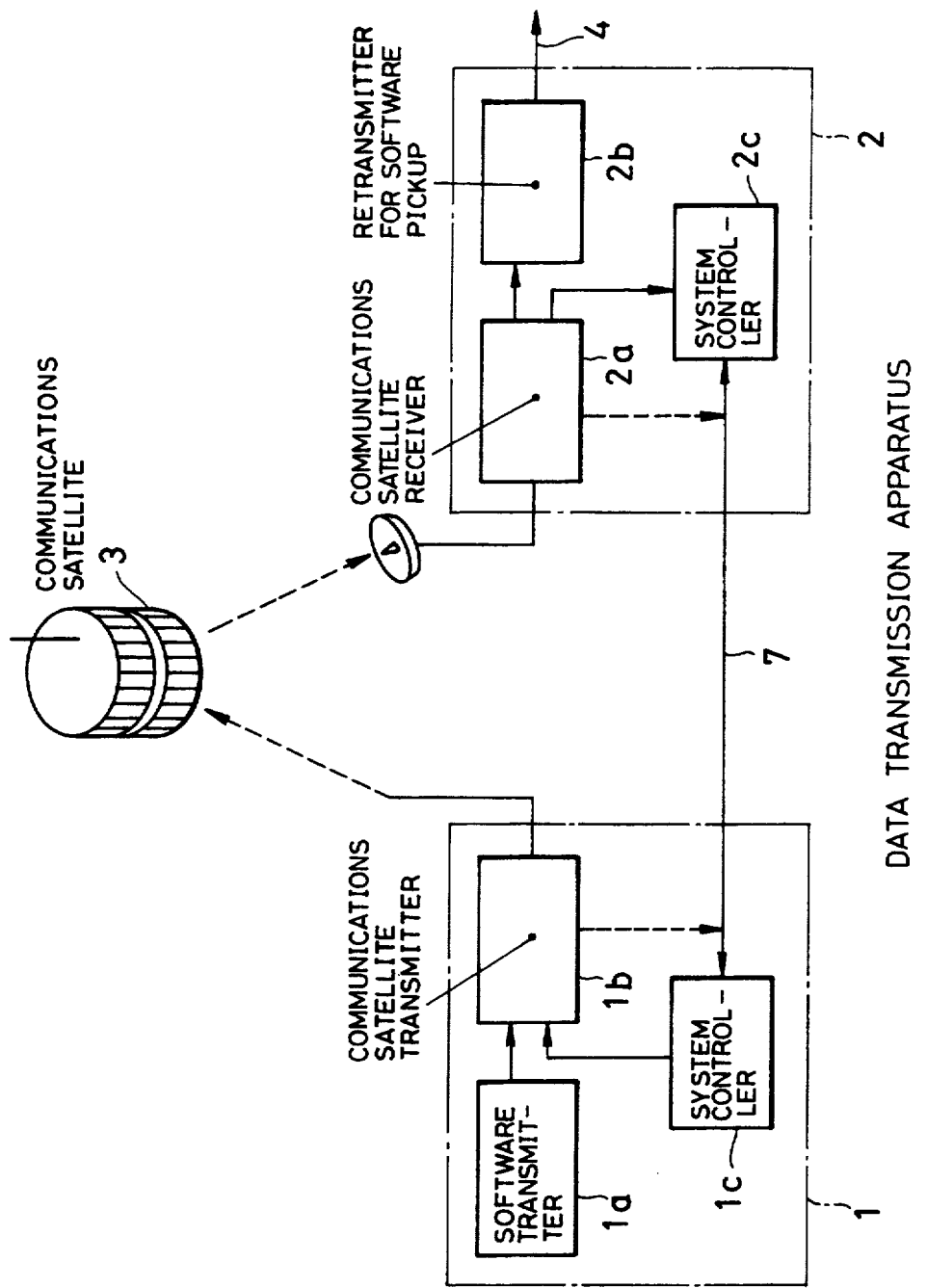
FIG. 2 is a schematic block diagram illustrating an information transmission apparatus according to the present invention.

Referring to FIG. 2, a software transmitter 1a of the base station 1 sends out an information signal containing three lines of information, a video signal as video information, a PCM audio signal as audio information and information data. The information data includes retransmission schedule data, video pickup information, data such as a bill message, and the aforementioned weather data. The contents of the information data can be selected according to purposes. The information signal is supplied to a satellite communication transmitter 1b as transmission means. Based on the received information signal, the satellite communication transmitter 1b modulates an uplink carrier wave, and transmits the modulated carrier to the communications satellite 3. The PCM audio signal is a PCM signal which includes not only audio data for television (TV) motion pictures but also BGM data for still pictures and other independent audio data. A system controller 1c performs the general control of the base station 1.

The communications satellite 3 retransmits the radio wave from the base station 1 to the ground with a downlink carrier wave having its carrier frequency converted. The modulated wave sent from the communications satellite 3 is demodulated in a satellite communication receiver 2a in a relay station 2 and is separated for each of the channels transmitted, thereby an information signal is provided for each channel. The information signal is stored in a rewritable recording medium (not shown), and is retransmitted via a coaxial cable 4 to the CATV terminals 5 from a retransmitter 2b in accordance with a retransmission schedule (to be described later). A system controller 2c performs the general control of the relay station 2.

The system controller 1c in the base station 1 is connected via a public line 7 on the ground to the system controller 2c of the relay station 2 to ensure bidirectional communication. When the base station 1 transmits a diagnosis code over the satellite line, this private line can be used to transmit the histories of data error statuses from the relay stations to the base station or request for retransmission of error-containing information signal sent through the satellite line.

Figure 3:
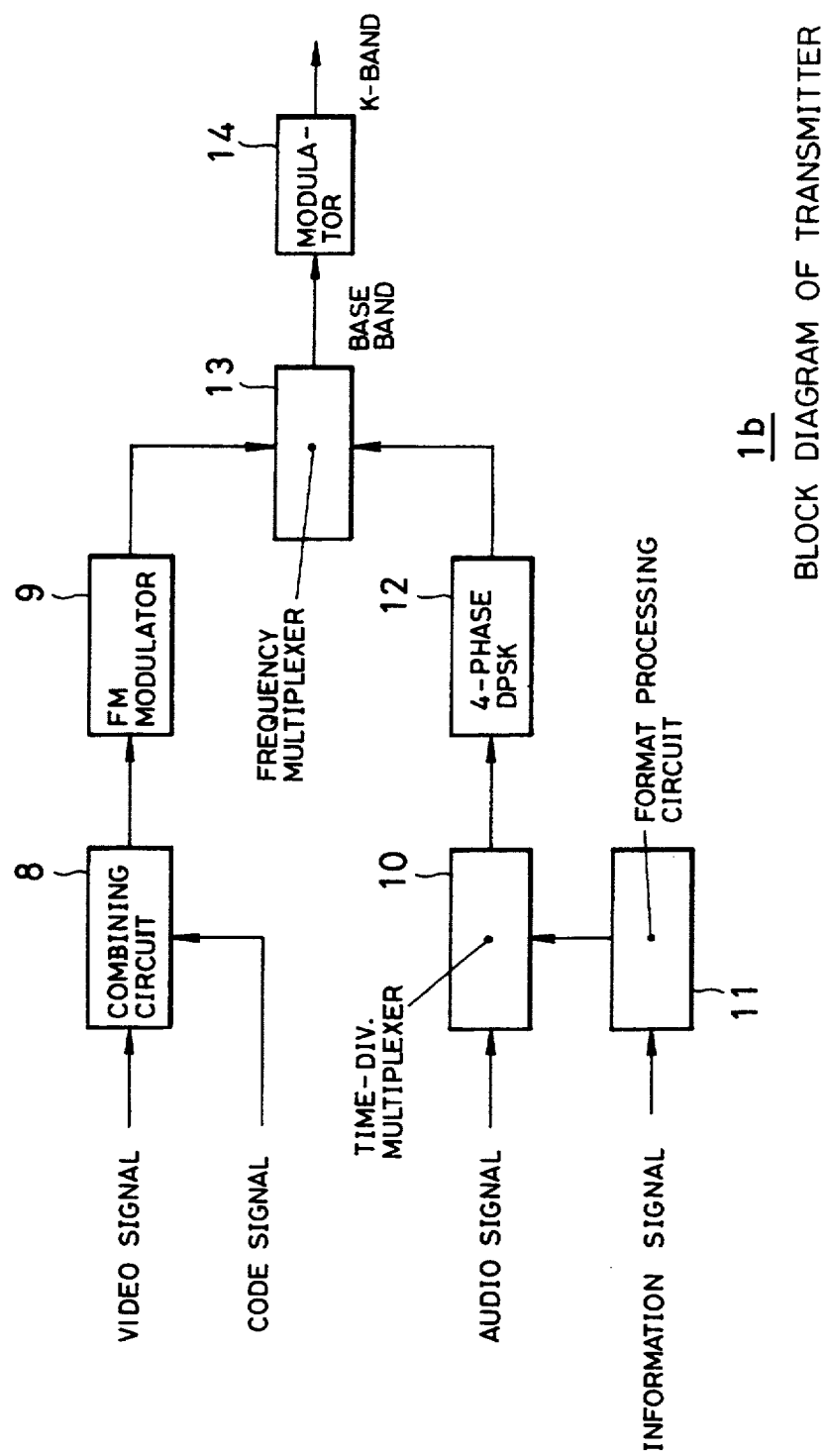
FIG. 3 is a block diagram showing a satellite communication transmitter in FIG. 2.

A base band signal transmitted in each channel signal will be described below. As shown in FIG. 3 a combining circuit 8 inserts code signals, such as a time code and attribute code, into a video signal in the vertical blanking period of the video signal. The resultant signal is then modulated in an FM modulator 9. Meanwhile, the PCM audio signal (hereinafter simply called "audio signal") is supplied to a time-division multiplexer 10 where it is multiplexed with information data, divided into packets by a format processor 11. The multiplexed signal is supplied to a 4-phase digital phase modulator 12 to be modulated into a digital subcarrier signal.

The video signal and audio signal, both after the modulation, are multiplexed in a frequency multiplexer 13, yielding a base band signal of a digital subcarrier sound adding system. Further, the base band signal is used in a modulator 14 to modulate an uplink carrier (27.50 to 29.25 GHz) to the satellite into a Ka band. The resultant signal is amplified before being transmitted.

Figure 4:
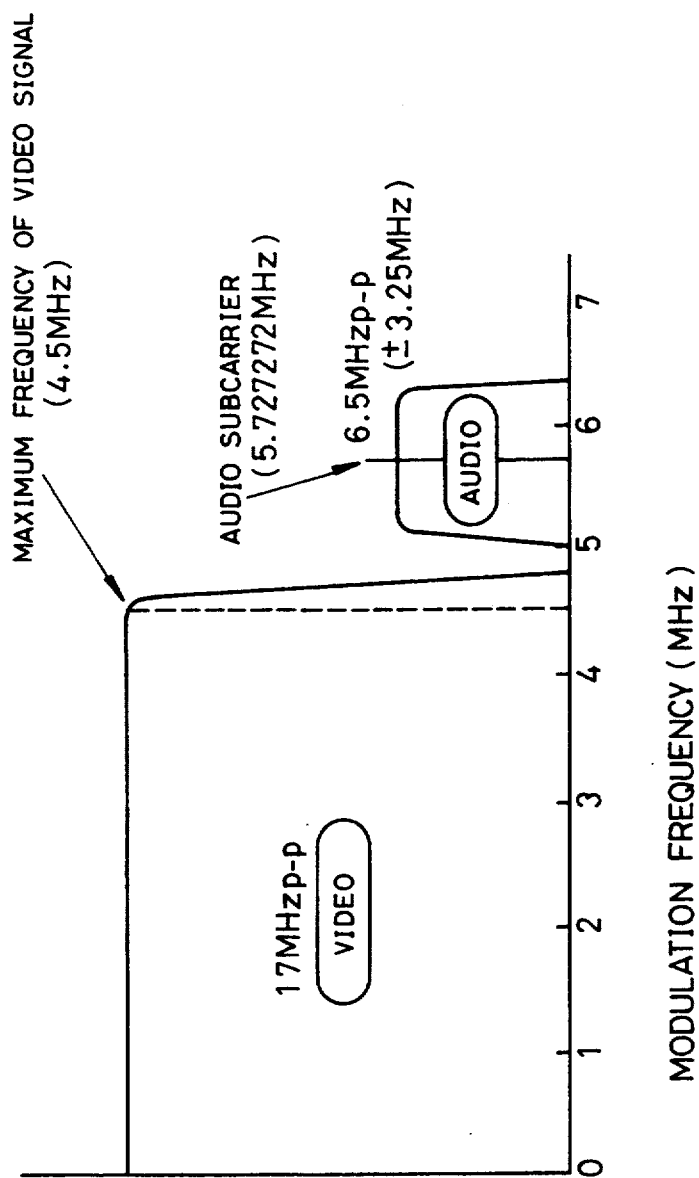
FIG. 4 shows the format of a base band signal in FIG. 3.
Figure 5:
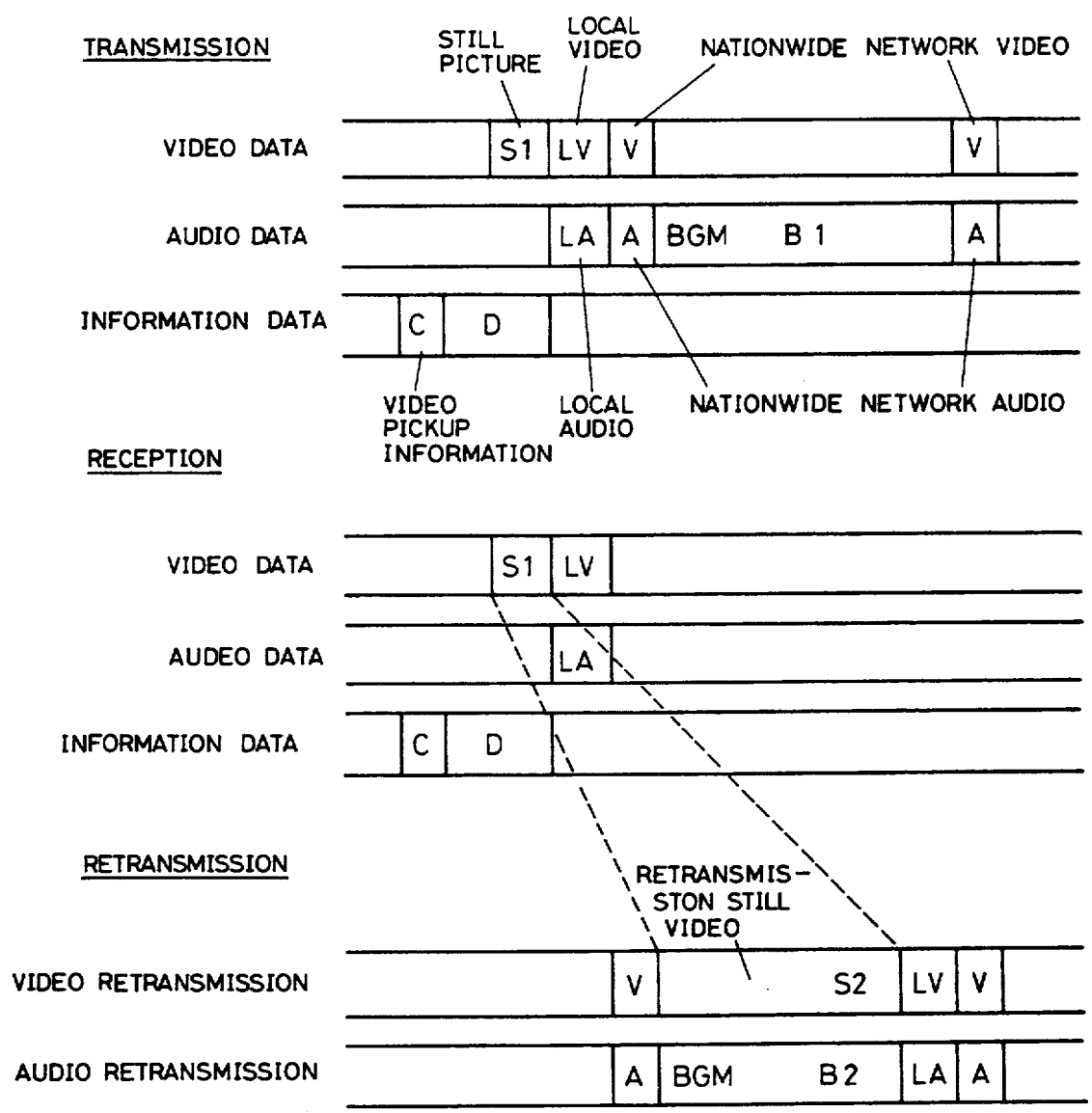
FIG. 5 is a timing chart of transmission and reception of an information signal by the information transmission apparatus according to the present invention.

As shown in FIG. 4, the base band signal has such a format that FM modulation wave of the video signal has a maximum modulation frequency of 4.5 MHz. With regard to the audio signal and the information data, a digital subcarrier system is employed to provide a 4-phase DPSK (Differential Phase Shift Keying; digital phase modulation) using a 5.727272-MHz subcarrier. The other specifications (item) are as shown in Table 1 below.

TABLE 1

AUDIO SIGNAL TRANSMISSION IN DIGITAL SUBCARRIER METHOD (VIA SATELLITE)

| Items | | Transmission Mode | |
|---|---|---|---|
| | | Mode A | Mode B |
| Signal | Audio signal bandwidth | 15 kHz | 20 kHz |
| Multi- | Sampling frequency | 32 kHz | 48 kHz |
| plex | Code transmission speed | 2.048 Mb/s ± 10 bps | |
| System | Number of channels | 4 channels | 2 channels |
| Modu- | Subcarrier frequency | 5.727272 MHz ± 16 Hz | |
| lation | Frequency shift in main | ±(3.25 MHz +10%, −5%) | |
| System | carrier by subcarrier | | |
| | Subcarrier modulation system | 4-Phase DPSK | |

As described above, the information signal to be transmitted from the communications satellite 3 consists of three channels for a video signal, an audio signal and information data. Of the three channels, the video signal channel has three types of image data. One is a nationwide network image (V), which is retransmitted in real time to all the CATV terminals 5, passing through every relay station 2. The second one is a still picture (S1), which may be prepared on the basis of the weather information coming from the meteorological satellite, and is selectively received by a predetermined relay station. The third data is a local image (LV) which is also received at its corresponding relay station.

The audio signal channel likewise has three types of audio signals, namely, two audio signals for the aforementioned nationwide network video (A) and local video (LA), and the last one for BGM (B1) at the time a still picture is transmitted. Of the three, the audio signals for the nationwide network image and local image are essential to an image so that they are transmitted at the same time as the video signal. As described earlier, the information data channel includes retransmission schedule data, video pickup information for each relay station, a bill message, a diagnosis data and other messages as well as information about image and sound.

Before transmission of an information signal from the base station 1, a schedule table for the information signal to be sent is transmitted to the relay station 2. Based on the table, the relay station 2 prepares itself for smooth reception. As illustrated in the timing chart for the transmission, reception and retransmission in FIG. 5, the base station 1 first sends video pickup information (C). The individual relay stations store this video pickup information.

Then, information data (D), such as the retransmission schedule data, voice code, or weather code, is transmitted. Subsequently, the still picture (S1) and local video information (LV) based on the retransmission schedule data are transmitted in the video channel. It is then determined whether or not the video signal should be picked up using the code signal included in the vertical blanking period of the video signal and the video pickup information previously stored. In the associated relay station 2, the video signal is recorded on a rewritable recording medium. As the video signal (V) for the nationwide network and its audio signal (A) are transmitted in FIG. 5, they are retransmitted unchanged in real time to the terminals 5.

Retransmission from the relay station 2 to the terminals 5 is carried out in accordance with the retransmission schedule data while reading out a video signal from the rewritable recording medium. Normally, the still picture S1 is compressed along the time axis, so that it is expanded along the time axis at the time of its retransmission and is retransmitted as a still picture S2. If necessary, the local image (LV) and voices (LA) would also be retransmitted, at the time the still picture (S2) is retransmitted. BGM (B2) is sent to the voice channel to the terminals 5. About 70 types of BGMs have been prepared in each relay station 2 and are arbitrarily selected before being transmitted.

Figure 6:
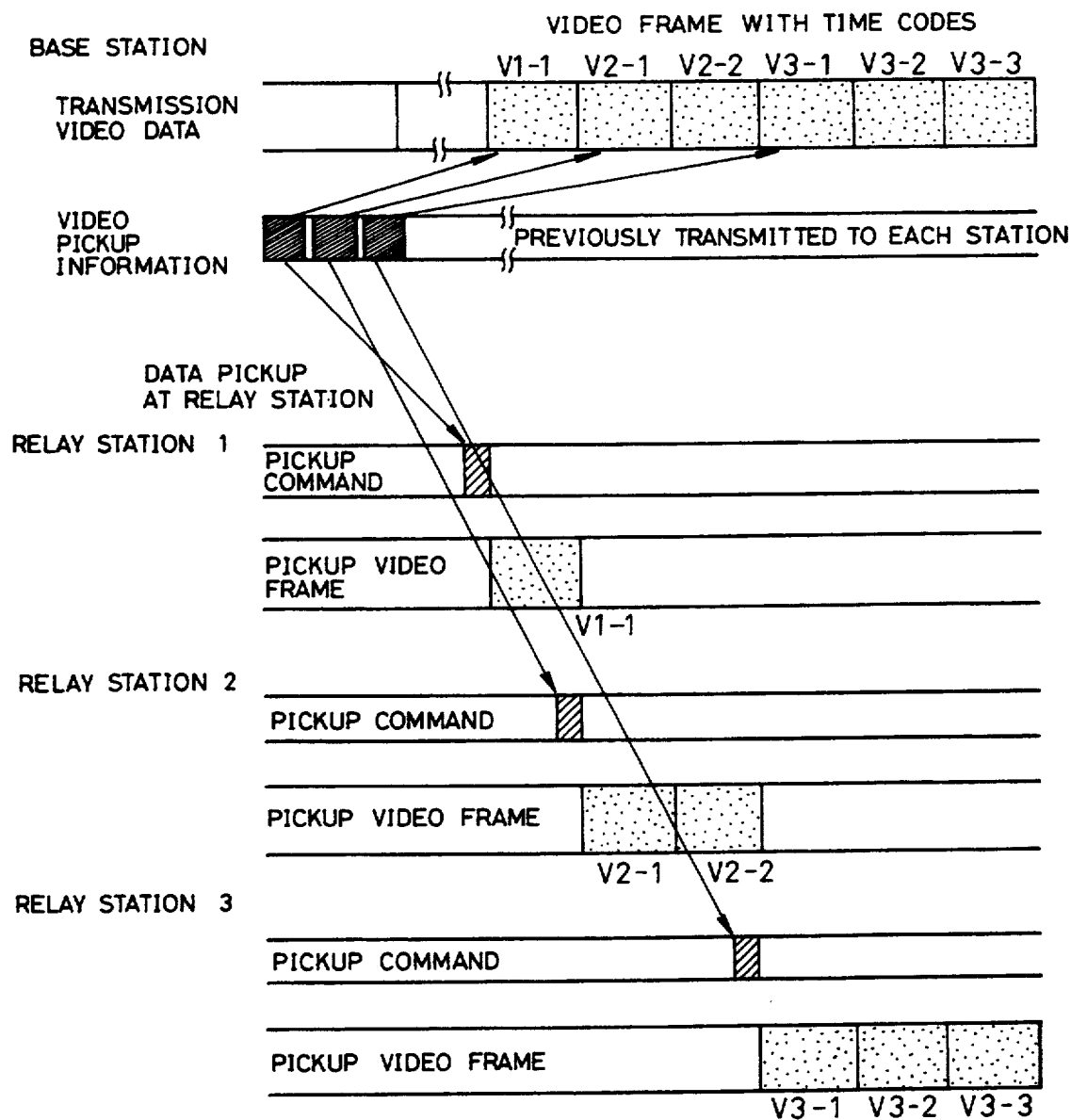
FIG. 6 is a timing chart for picking up a video frame in FIG. 5.

While the video signal from the base station is transmitted frame by frame, whether the frame is to be picked up in the relay station is known previously based on the present video pickup information. Suppose that there are three relay stations as shown in FIG. 6. In this case, the video pickup information is included in the information data in advance and transmitted. As the frame V1-1 should be received at a relay station [1], a reception command is issued in the relay station [1] to store the frame V1-1 in the rewritable recording medium. As the frames V2-1 and V2-2 are to be acquired in the relay station [2], a pickup command is issued in the relay station [2]. Likewise, with regard to the three frames V3-1, V3-2 and V3-3, a pickup command is issued for in the relay station [3].

The time code, inserted in the vertical blanking period of each frame of each video signal mentioned above, is an 8-digit BCD code representing "hour," "minute," "second" and the frame number of that frame. The attribute code is also an 8-digit BCD code, and consists of two digits of weather code, two digits of a voice code and four digits of reserve code.

Figure 7:
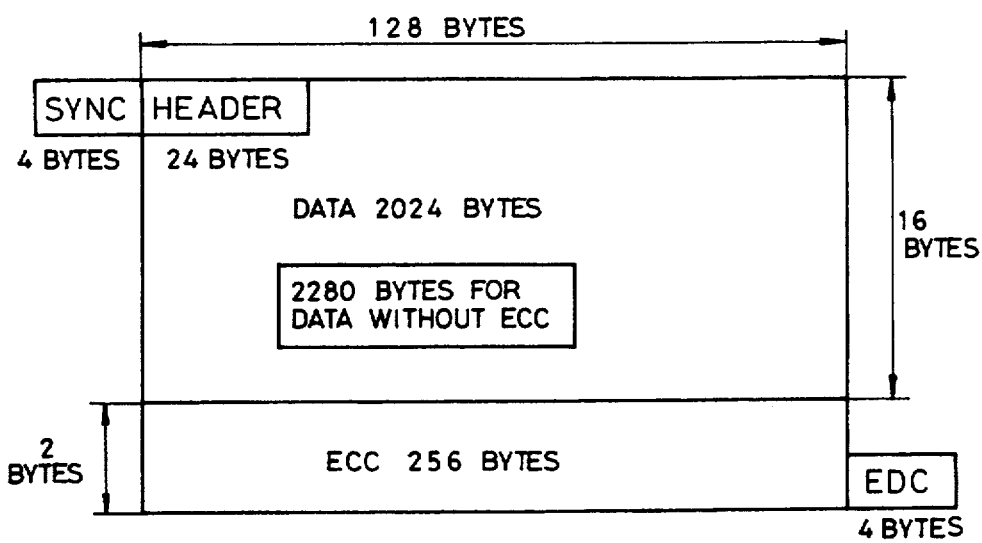
FIG. 7 is diagram illustrating the format of information data in the information transmission apparatus according to the present invention.

The information data is divided into packets each of 2312 bytes, and is transmitted as being multiplexed, with the time axis, to the information data channel. As shown in FIG. 7, a 4-byte sync signal SYNC is affixed to the head of each packet to permit each relay station to identify the packet and catch it when necessary. This sync signal SYNC has a double-sync structure which has identical two 2-byte sync signals different from those of the other packets and arranged continuously, so that detecting one of them is sufficient to surely identify and catch the packet. Following the SYNC, there are 2024-byte data containing a HEADER portion, a 256-byte error correct code ECC, and a 4-byte error detect code EDC added at the end. The ECC operation for error correction involves a Reed-Solomon code, for example, to ensure error correction of one byte in 16-byte of data. In other words, the ECC operation on a group of data permits the detection of the presence/absence of an error for a column (vertical direction in FIG. 7) of data and correction of the error if any. The EDC operation on a group of data allows for the detection of the presence/absence of an error over the entire rows and columns (horizontal direction in the figure) of data and also the detection of error correction by ECC (ECC correction). The error detection by the EDC shows high accuracy, and ensure finer detection than the ECC-oriented error detection. Three types of information about a data error, namely, the ECC-involving detection of the presence/absence of an error, the EDC-involving detection of presence/absence of an error and the occurrence/non-occurrence of ECC correction, are used as error detection data to be described later. In the case where no ECC operation is performed and only the EDC-involving error correction is carried out, the information data area has a size of 2024 bytes for data plus 256 bytes for the ECC, amounting to 2280 bytes.

Figure 8:
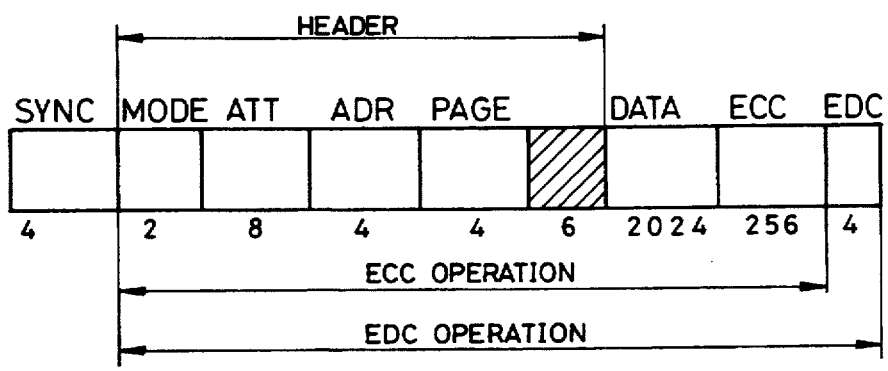
FIG. 8 is a diagram showing the format of the header of information data in FIG. 7.
Figure 9:
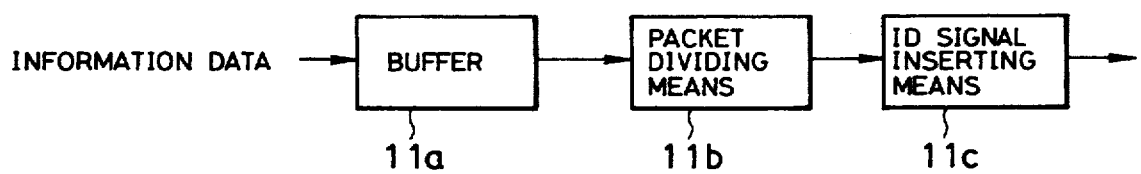
FIG. 9 is a block diagram illustrating a format processor in FIG. 3.

At the head of the data area is located a 24-byte header (HEADER), which is divided into five blocks of MODE, ATT, ADR, PAGE and a reserve area, as shown in FIG. 8. MODE is an ID code to determine whether error correction should be made. ATT consists of eight bytes, and its first and second bytes represent the attributes of information data. In the case of weather data, those two bytes become codes to identify the type of a meteorological satellite 6 (AMeDas, Himawari, Meteor, etc.) and to indicate the seasons, typhoon, thunder, etc. In the case of the voice code, the two bytes become an ID code to identify the types of an audio signal, such as stereo, bilingual, monaural, and multiplex audio. Those two bytes of ATT include ID codes for retransmission schedule data, reception enable, a bill message, error diagnosis, other messages and data for a local image. The third to eighth bytes of ATT are supplied with data (month, day and time) specifying the transmission time. ADR is a relay station designation code representing the area classification for each relay station and the address thereof. Each relay station 2 determined whether the information signal is addressed to itself referring to the contents of ADR. ADR consists of four bytes, the second byte classifying the site of the relay station and the fourth byte indicating the address of the relay station. When the second and fourth bytes are both "0," it means simultaneous broadcasting to the entire relay stations. The first and third bytes are reserved for the future use.

The information data does not always fit in a signal packet having a capacity of 2280 bytes. The information data is often packed in multiple packets by the same attribute, i.e., by the same type. Further, the same type of packets are not always sent one after another, but various types of packets are sometimes sent at random. The base station 1 therefore inserts a packet ID signal in each packet. In the packet format processor 11 in FIG. 9, the information data written in a buffer memory 11a is read out in the units of 2024 bytes or 2280 bytes, and supplied to packet dividing means 11b which divides the data into packets. In ID signal inserting means 11c, the packet ID signal is inserted in PAGE in the header by four bytes, for example, as (packet number/total number of packets), and is supplied to the time-division multiplexer 10. This packet ID signal consists of the total number of packets of the same type and the individual packet numbers within a group of the same type of packets. Upon reception of the information data, the relay station arranges multiple packets in the order of the packet numbers, based on the total number of packets and the packet numbers included in PAGE. When the relay station has received all packets of the same type, the relay station can decode data from those packets as one package. The packets may not be transmitted to the relay station in the order of their packet numbers, but may be transmitted at random. Since the relay station is informed of the total number of the packets in this case, the relay station re-arranges the received packets according to the packet numbers, groups the packets by the type, and processes the data or decodes the information. This can provide a sort of a scramble effect.

As described above, the ID code included in the header is very important; however, with the ECC operation shown in FIG. 8, data error cannot be corrected until 2280 bytes of data are all received. If the ID code included in ADR of the header indicates the received data being irrelevant to the relay station itself immediately after reception of the header, the relay station can terminate the reception of the remaining 2280 bytes of data. In this respect, a 2-byte redundant code is provided in the reserved block in the header for correction of an error in its own header, and the contents of the header are decoded immediately after the reception of the header.

Figure 10:
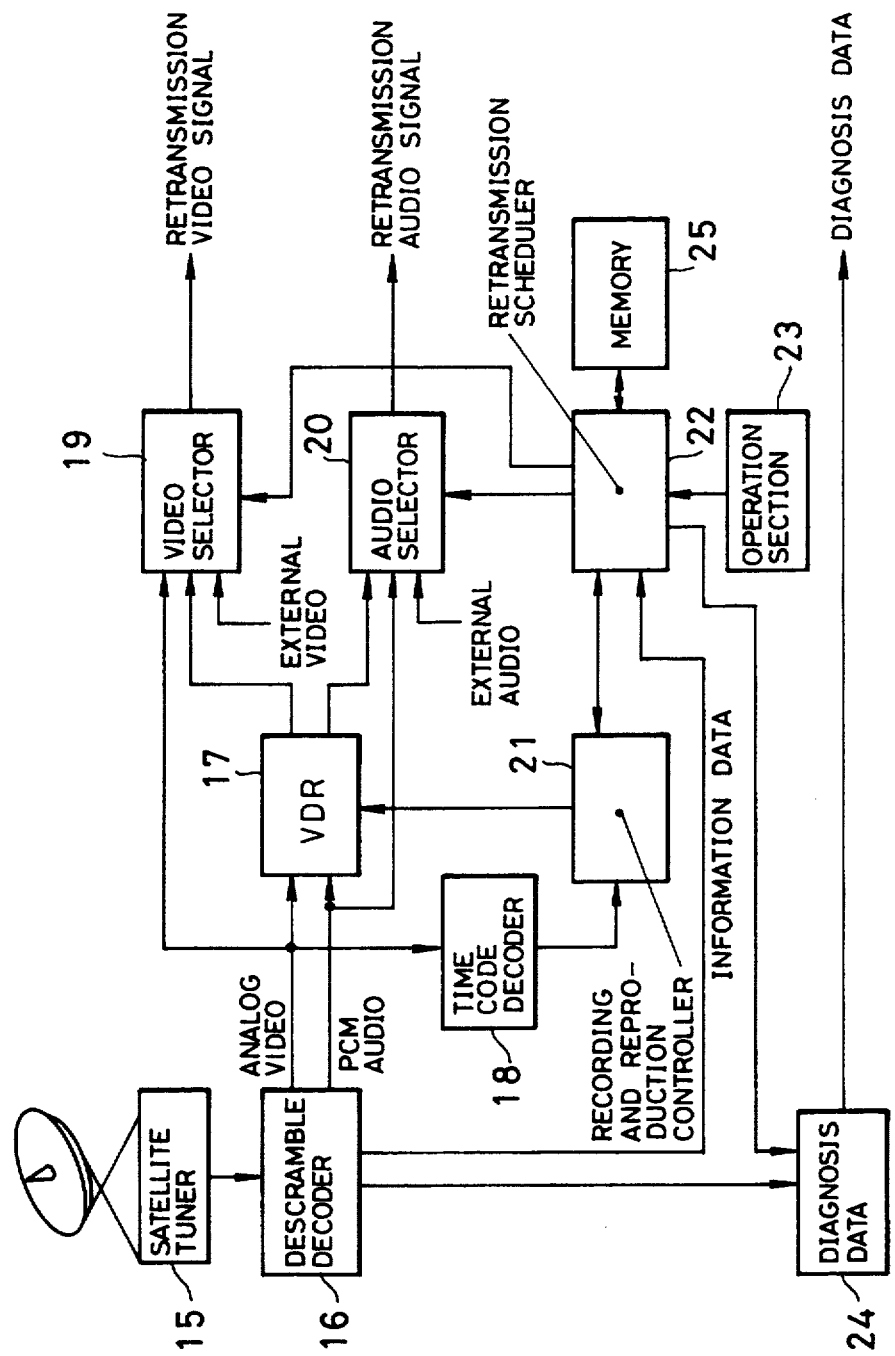
FIG. 10 is a block diagram illustrating relay stations as receiving stations according to the present invention.

How the information signal flows in each channel of the relay station will now be described. In FIG. 10, the modulation wave from the communications satellite 3 is received at a satellite tuner 15 serving as receiving means, and then is supplied to a descramble decoder 16. Since the base station 1 has scrambled the information signal to prevent the wiretapping by unauthorized parties or non-subscribers, the descramble decoder 16 descrambles the received data to acquire the information signal. Then, the information signal is separated into the video signal, audio signal, and information data and demodulated respectively.

The FM-demodulated video signal is supplied to a VDR (video disk recorder) 17, a time code decoder 18 and a video selector 19. The VDR 17 serves as recording medium play means which performs data recording on and data reproduction from an optical disk (not shown) as a rewritable recording medium. The audio signal after digital phase modulation is sent to the VDR 17 and an audio selector 20. The time code decoder 18 extracts a time code and an attribute code which have been inserted into the vertical blanking period of the video signal, decodes the codes and supplies them to a recording and reproduction controller 21. The recording and reproduction controller 21 supplies a record command to the VDR 17 in accordance with the time and attribute codes. The frame of a video signal and an audio signal to be retransmitted to each terminal stations 5 are recorded by the VDR 17. Error detection and correction are made on the information data, which has been received and demodulated prior to the video and audio signals, and this information data is stored in a memory 25 by a retransmission scheduler 22.

Figure 11:
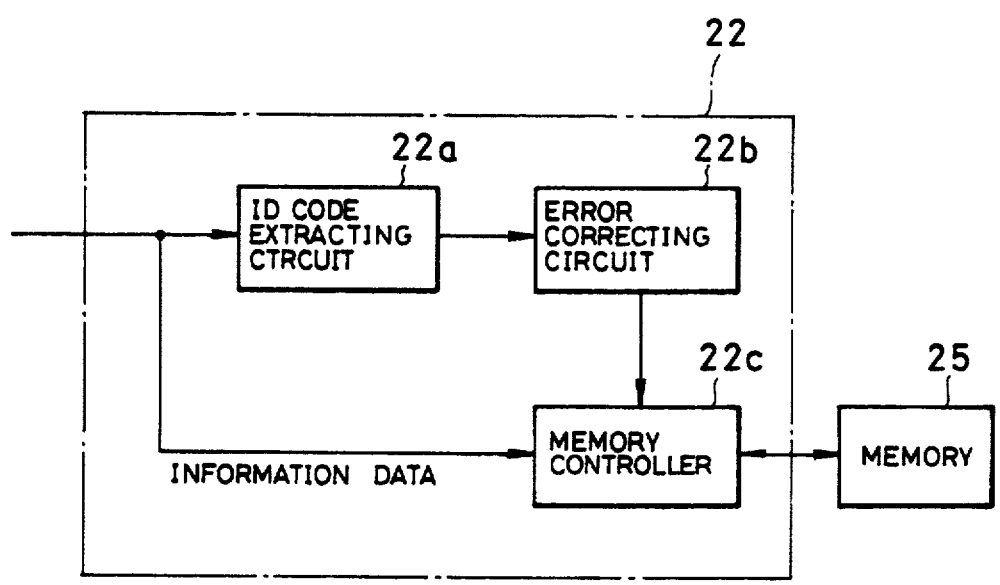
FIG. 11 is a block diagram of a retransmission scheduler 22 in FIG. 10.

In FIG. 11, the information data supplied packet by packet to the retransmission scheduler 22 is sent to an ID code extracting circuit 22a so that the circuit 22a extracts the ID code of the header in each packet. An error correcting circuit 22b, located in the succeeding stage of the circuit 22a, performs error correction on the ID code, and supplies the resultant code to a memory controller 22c. If the memory controller 22c judges the ID code as information data to be acquired at the station itself, a packet of data following the header is written into the memory 25, based on the packet ID signal.

Figure 12:
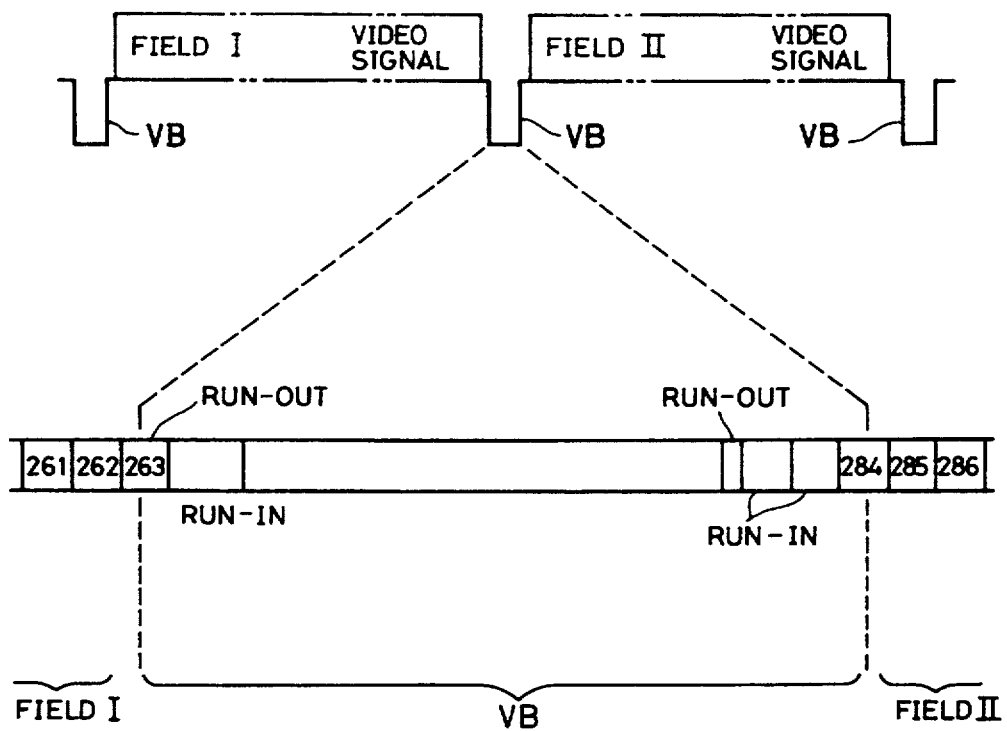
FIG. 12 is a diagram showing the format of a record signal in FIG. 10.

Since the rewritable recording medium and an apparatus to play the medium are disclosed in Japanese Patent Application No. H2-300672 by the present applicant, their detailed description will not be given in this specification. According to that invention, a video signal of a predetermined format, such as NTSC and PAL, is converted into a digital signal, then is compressed along the time axis. The resultant signal is converted again into an analog signal and is FM-modulated to be recorded on an optical disk. Further, a PCM audio signal is inserted into the vertical blanking period VB of the video signal for multiplex recording as shown in FIG. 12.

In general, when the video signal is recorded on a recording medium, not limited to an optical disk as used in this embodiment, and the disk is played to reproduce the original video signal, a so-called dropout occurs due to defects of the recording medium, such as scratches or stains. Normally, the line correlation between video signals is used to compensate for the dropout. Since the video signal carrying a dropout is not entirely the same as the video signal to compensate for the dropout, however, perfect compensation is difficult. With the use of an optical disk which has addresses for a record area in advance as in this embodiment, the addresses are searched for the address of the area which has scratches, stains or the like. The recording/reproduction controller 21 in FIG. 10 performs address management for the optical disk where data is to be recorded, in such a way that the video and audio signal are recorded on the disk, avoiding any scratched or stained area. According to this address management, after a retrieval mode is set first before the information signal is recorded and a predetermined reference signal, such as sine wave or a digital pulse with the duty ratio of 50%, is recorded on the entire record area on the optical disk, and when the disk is played and the retrieved read signal has dropout, the address of the location of the dropout is stored. Then, the information signal is recorded in the normal areas on the disk, excluding the dropout area while checking the address of the record area in record mode. The use of such a recording method can prevent the occurrence of a dropout.

Figure 13:
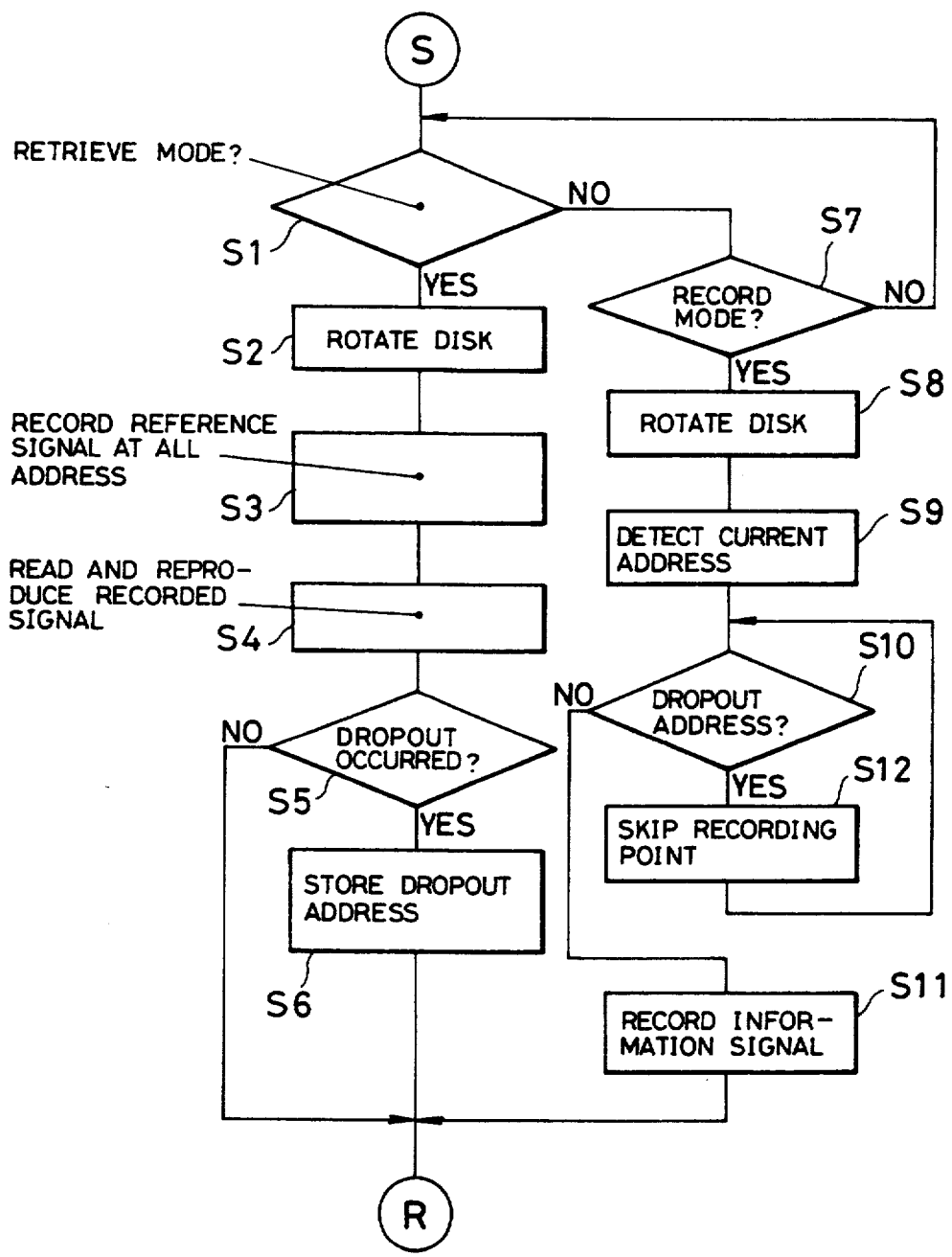
FIG. 13 is a flowchart of the operation which a recording/reproduction controller 21 in FIG. 10 executes.

FIG. 13 shows a flowchart of a subroutine which the recording and reproduction controller 21 performs. When a mode is selected in the main routine (not shown), it is determined if the selected mode is a retrieval mode (step S1). If it is judged as the retrieval mode, a disk is rotated (step S2), and a reference signal is recorded at every address in the record area of the disk (step S3). The disk, after recording, is played to read and reproduce the record signal (step S4). It is then determined whether a dropout appears in the reproduced signal (step S5). When the dropout has occurred, the associated address is stored as a dropout address (step S6), and the flow returns to the main routine. If no dropout is detected in step S5, the flow returns to the main routine without performing further processes.

If the selected mode is judged as a record mode at the time of actually recording the information signal (step S7), the disk is rotated (step S8), and the information signal is recorded on the disk. The address of the recording point is detected as the information signal is recorded (step S9). It is then determined whether or not the address is the dropout address (step S10). When the address is not judged as the dropout address, the information signal is recorded at the recording point associated with the address (step S11). If the address is judged as the dropout address, the recording point of that address is skipped (step S12), and the information signal will not be recorded unless the address of a new recording point differs from the dropout address. The flow then returns to the main routine.

In the case where an optical disk having video and audio signals recorded thereon is played to reproduce signals, a signal processing of the direction reverse to the signal-recording process needs to be performed as a matter of course, and then reproduced video and audio signals can be obtained. A video signal (V) and an audio signal (A) for a nationwide network are retransmitted through the relay station 2 to the terminal stations 5 in real time as mentioned above, and will not be recorded in the VDR 17.

Based on a retransmission schedule stored in the retransmission scheduler 22, still pictures, BGM, and local video and local audio signals are retransmitted from the relay station 2 to the terminal stations 5. The retransmission scheduler 22 supplies a retransmission command to the recording and reproduction controller 21, which in turn sends a reproduction-playing command to the VDR 17. In accordance with the reproduction-playing command, the video and audio signals are reproduced while executing signal processing, such as expanding of the still picture along the time axis. The reproduced signals are then supplied to the video and voice selectors 19 and 20, respectively. According to a select command from the retransmission scheduler 22, the video selector 19 sends a nationwide-network video signal, still pictures, a local video signal, or an external video signal produced by the relay station, through a transmitting section (not shown) to the terminal stations 5. At the same time, the voice selector 20 sends a nationwide-network audio signal, BGM for still pictures, a local audio signal, or the audio signal of the external speech signal to the terminal stations 5. The external video and speech signals are edited for transmission through an operation section 23 to the terminal stations 5 to be put together with the retransmission schedule from the base station 1.

Figure 14:
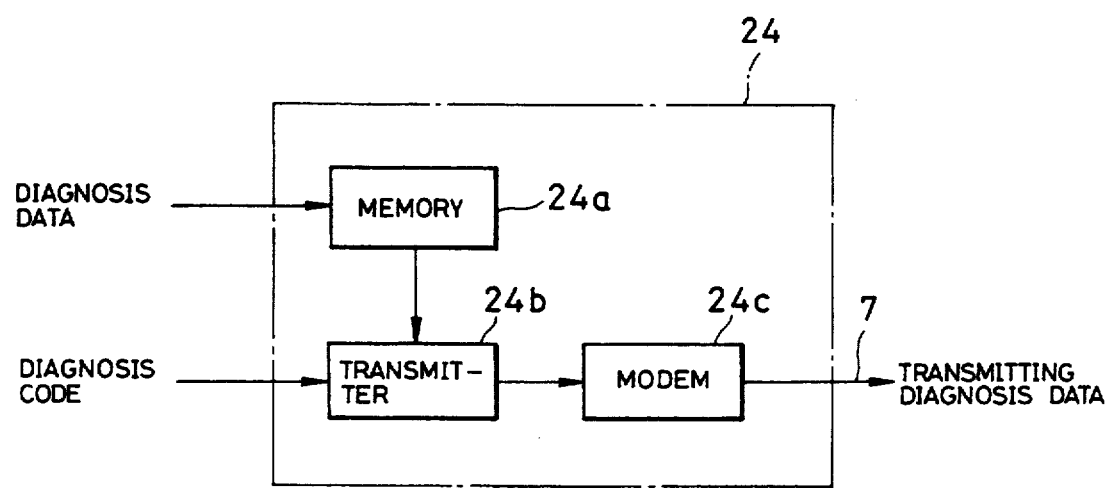
FIG. 14 is a block diagram of diagnosis-data memory 24 in FIG. 10.

Error detection data from the descramble decoder 15 is supplied to a diagnosis-data memory 24. In FIG. 14, the diagnosis data is stored and accumulated in a memory 24a. In accordance with a diagnosis code as a command to return error diagnosing information from the base station 1, the diagnosis data is then transmitted from a transmitter 24b, via a line connecting means 24c, such as a modem, over the public telephone line 7 to the base station 1. The diagnosis code is included in ATT which is attribute data of information data in the header format shown in FIG. 8. Upon reception of the diagnosis data or requests from the relay stations 2, the base station 1 retransmits correct data. Further, based on the diagnosis data, the base station 1 controls the entire satellite communications system, such as increase in the output from the base station 1, or repetitive transmission of the same data.

Figure 15:
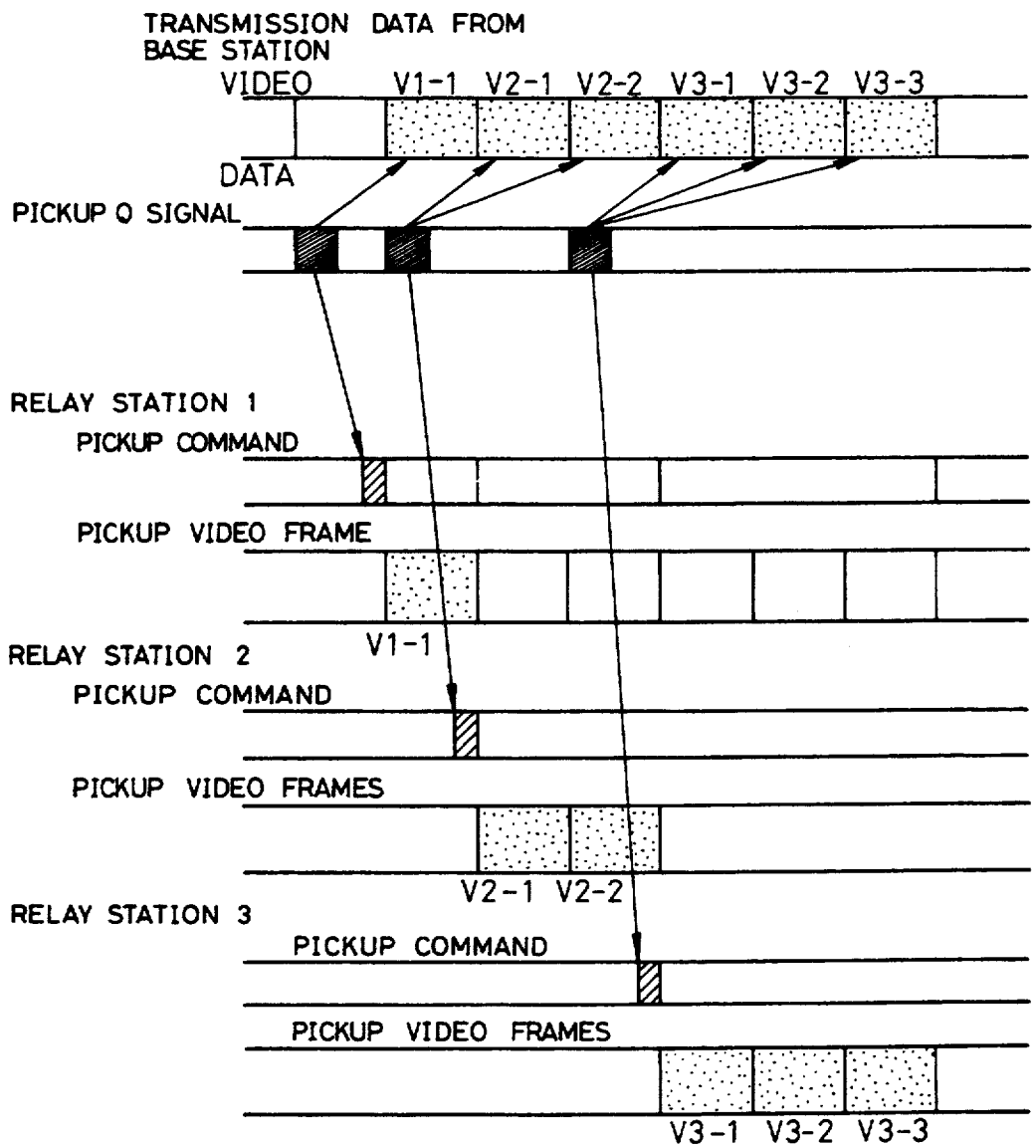
FIG. 15 is a timing chart for picking up a video frame according to another embodiment of the present invention.

According to this embodiment, the video pickup information is previously sent to the respective relay station as shown in FIG. 6. Another embodiment where the video acquisition information is sent upon each transmission of a video signal will now be described referring to FIGS. 15 and 16. In FIG. 15, a data acquisition signal Q is transmitted one frame before a video frame V1-1 for a relay station 1. In response to the signal Q, the relay station 1 outputs a pickup command to receive the frame V1-1. A relay station 2 receives the signal Q one frame before a video frame V2-1, so that two frames (V2-1, 2-2) are captured. Likewise, a relay station 3 will capture three frames (V3-1, 3-2 and 3-3).

Figure 16:
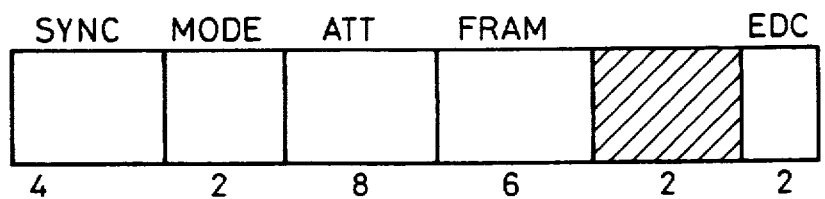
FIG. 16 is a diagram showing the format of a pickup Q in FIG. 12.

The data fetch signal Q has a format consisting of 24 bytes as shown in FIG. 16. SYNC, the first four bytes, has two consecutive 2-byte sync signals as in the data format shown in FIGS. 7 and 8. Even if the first SYNC signal is missed, synchronization can still be attained by catching the next SYNC signal, as in the first embodiment. Particularly in this embodiment, since the video frames immediately follow the signal Q, detection of the signal Q should not be missed, and it is important to catch the SYNC signal. MODE, consisting of two bytes, specifies the data acquisition signal Q, and also indicates whether the error correct code (ECC) is added or not. ATT indicates the attribute of information data, while EDC is an error detection code. The signal Q is transmitted at least three times in a row before the start of the frame to be acquired. During this transmission, the relay station 2 is controlled to complete preparation of the VDR 17 for recording. The use of a so-called fail safe system in this embodiment, therefore, ensures data acquisition with high reliability. 6-byte FRAM indicates the number of video frames to be sequentially received. The number of frames of still pictures to be acquired is expressed by minutes, seconds and frame numbers, and only the designated number of frames are written in the VDR 17.

As described above, in the information transmission system according to the first aspect of the invention, at the time a digital information signal is sent from the transmission station to the receiving station, the digital information signal is divided into packets of a predetermined amount of information for each type, and a packet identification signal, consisting of the total number of consecutive packets carrying packet information of the same type and a packet number specifying an associated packet among the consecutive packets, is inserted in each packet. The resultant signal is then transmitted. Even when digital information signals of different types are transmitted after multiplexed along the time axis, therefore, information signals of the same type would not occupy a line for a long period of time, ensuring efficient use of the line, and information signals of different types would not be mixed together, ensuring reliable information transmission.

Further, since any relay station is informed of the total number of the packets, the relay station having received the packets can re-sort the received packets according to the packet numbers, and can separate the packets into groups by the type before performing data processing. This can provide a data scramble effect.

In the information transmission system according to the second aspect of the invention, the base station sends an information signal to the relay station, the relay station stores diagnosis data of an error in the information signal in the memory, and automatically transmits the stored diagnosis data to the base station in response to a diagnosis return instruction sent from the base station. The base station can therefore acquire diagnosis data of the transmitted information signal whenever necessary.

In the information transmission apparatus according to the third aspect of the invention, the base station divides a digital information signal into packets of a predetermined amount of information, and transmits the packets each affixed with an error correct code bit to the multiple relay stations together with the identification code including a relay station pointing code for the self relay station and also affixed with an error correct code bit. As each relay station can receive only those packets addressed to itself, highly efficient information transmission is possible.

What is claimed is:

1. An information transmission system comprising a transmission station for transmitting a digital information signal and at least one receiving station for receiving the digital information signal, said transmission station including:
   dividing means for dividing said digital information signal into packets each including a predetermined amount of information of a same type;
   inserting means for inserting into each packet a packet identification signal indicative of a total number of consecutive packets carrying packet information of the same type and a packet number specifying an associated packet among the consecutive packets; and
   transmission means for transmitting the packets containing the packet identification signal, and said receiving station including:
   a memory;
   extraction means for extracting said packet identification signal from said digital information signal; and
   writing means for writing said digital information signal into said memory in an order determined by said packet number for each packet information of the same type in the packet identification signal extracted by the extraction means.

2. The system of claim 1, wherein said digital information signal is written into said memory by said writing means until said packet number of said digital information signal stored in said memory coincides with said total number of said consecutive packets.

3. The system of claim 2, further comprising image producing means for producing an image signal by processing an output signal from said memory.

4. The system of claim 3, wherein said digital information signal represents weather information, and said image producing means produces an image signal of weather data to be retransmitted from said receiving station.

5. An information transmission system comprising:
   a base station for transmitting a digital information signal;
   at least one relay station for receiving the digital information signal and transmitting a retransmission signal; and a plurality of terminal stations coupled to and receiving said retransmission signal from said at least one relay station, said base station including:

dividing means for dividing said digital information signal into packets of a predetermined amount of information of a same type;

inserting means for inserting in each packet a packet identification signal indicative of a total number of consecutive packets carrying packet information of the same type and a packet number specifying an associated packet among the consecutive packets; and transmission means for transmitting the packets containing the packet identification signal;

wherein said relay station comprises a retransmission scheduler, said retransmission scheduler comprising:

a memory;

extracting means for extracting the packet identification signal from the received digital information signal;

writing means for writing the digital information signal into said memory in an order determined by said packet number for each packet information of the same type in the packet identification signal extracted by the extraction means;

reading means for reading out said digital information signal written into said memory; and transmitting means for transmitting said retransmission signal which comprises an output signal of said reading means, to said plurality of terminal stations.

6. The system of claim 5, wherein said digital information signal is written into said memory by said writing means until said packet number of said digital information signal stored in said memory coincides with said total number of said consecutive packets.

7. The system of claim 6, further comprising image producing means for producing an image signal by processing an output signal from said memory.

8. The system of claim 7, wherein said digital information signal represents weather information, and said image producing means produces an image signal of weather data to be retransmitted from said relay station.

9. An information transmission system comprising:

a base station for transmitting an information signal and a relay station for receiving said information signal, said relay station including:

detector means for detecting errors in said information signal and producing error diagnosis data;

a memory for storing said diagnosis data; and transmission means for transmitting said diagnosis data to said base station in response to a diagnosis return instruction signal sent from said base station.

10. An information transmission system according to claim 9, wherein said transmission means transmits said diagnosis data to said base station via a transmission path different from a transmission path for said information signal.

11. An information transmission system comprising:

a base station for transmitting a digital information signal, a plurality of relay stations for receiving said information signal and transmitting a retransmission signal, and a plurality of terminal stations coupled to and receiving the retransmission signal from said plurality of relay stations, said base station including:

dividing means for dividing said digital information signal into packets of a predetermined amount of information; and inserting means for inserting first correction code bits for error correction and an identification code including relay station indicating codes of designated relay stations into each of the packets, with second correction code bits for self error correction being included in the identification code, and each of said relay stations including:

extracting means for extracting said identification code from received packets; and error correction means for performing error correction on said identification code acquired by said extracting means using said second correction code bits.

12. The system of claim 11, wherein said digital information signal is weather information.

13. The system of claim 12, wherein said relay station further comprising means for transmitting correction information to said base station.

* * * * *